US011234027B2

(12) United States Patent
Feldman et al.

(10) Patent No.: US 11,234,027 B2
(45) Date of Patent: Jan. 25, 2022

(54) AUTOMATED CONTENT COMPILATION

(71) Applicant: Disney Enterprises, Inc., Burbank, CA (US)

(72) Inventors: Vladislav Feldman, Manhasset Hills, NY (US); Michael J. Strein, Bohemia, NY (US); Efthimis Stefanidis, Douglaston, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/245,011

(22) Filed: Jan. 10, 2019

(65) Prior Publication Data

US 2020/0228850 A1    Jul. 16, 2020

(51) Int. Cl.
| | |
|---|---|
| *H04N 21/45* | (2011.01) |
| *H04N 21/84* | (2011.01) |
| *H04N 21/234* | (2011.01) |
| *H04N 21/81* | (2011.01) |
| *H04N 21/845* | (2011.01) |
| *G06F 16/45* | (2019.01) |

(52) U.S. Cl.
CPC ....... *H04N 21/23424* (2013.01); *G06F 16/45* (2019.01); *H04N 21/812* (2013.01); *H04N 21/8456* (2013.01)

(58) Field of Classification Search
CPC .......................... H04N 21/234; H04N 21/235
USPC .................................................. 725/74–114
See application file for complete search history.

(56) References Cited

U.S. PATENT DOCUMENTS

| | | | | |
|---|---|---|---|---|
| 10,904,638 | B2* | 1/2021 | Lee ...................... | G11B 27/036 |
| 2008/0201736 | A1* | 8/2008 | Gordon .............. | H04N 21/2365 725/34 |
| 2010/0145794 | A1* | 6/2010 | Barger ............... | G06Q 30/0246 705/14.45 |
| 2010/0211442 | A1* | 8/2010 | Venkataraman ....... | G06Q 30/02 705/14.5 |
| 2011/0023059 | A1* | 1/2011 | McCallister ......... | H04N 21/242 725/32 |
| 2011/0264530 | A1* | 10/2011 | Santangelo ........ | G06Q 30/0251 705/14.64 |
| 2012/0004982 | A1* | 1/2012 | Cohee .................... | G06Q 30/02 705/14.42 |

(Continued)

*Primary Examiner* — Mushfikh I Alam
(74) *Attorney, Agent, or Firm* — Farjami & Farjami LLP

(57) ABSTRACT

In one implementation, an automated content compilation system includes a computing platform having a hardware processor and a system memory storing a content integration software code. The hardware processor executes the content integration software code to receive commercials for presentation with a media content including primary content segments and predetermined advertising intervals, and to assemble commercial clusters corresponding respectively to the predetermined advertising intervals, each of the commercial clusters including a subset of the commercials. The content integration software code further compiles a content file including a data structure having the commercial clusters linked with the primary content segments, the data structure including one or more playlist(s) identifying a location of each of the commercials in the data structure, and provides the content file for playout of the media content as an integrated content stream including the primary content segments and the commercial clusters.

20 Claims, 3 Drawing Sheets

(56) References Cited

U.S. PATENT DOCUMENTS

| | | | |
|---|---|---|---|
| 2012/0198492 A1* | 8/2012 | Dhruv | H04N 21/23424 725/32 |
| 2013/0298159 A1* | 11/2013 | You | H04N 21/44213 725/34 |
| 2013/0332971 A1* | 12/2013 | Fisher | H04N 21/26258 725/93 |
| 2014/0040026 A1* | 2/2014 | Swaminathan | G06Q 30/02 705/14.53 |
| 2014/0101551 A1* | 4/2014 | Sherrets | H04N 21/2743 715/723 |
| 2014/0156800 A1* | 6/2014 | Faivo | H04N 21/8456 709/219 |
| 2014/0373049 A1* | 12/2014 | Carr | G06Q 30/0244 725/34 |
| 2015/0026719 A1* | 1/2015 | Menon | H04N 21/2668 725/34 |
| 2015/0271541 A1* | 9/2015 | Gonder | H04N 21/278 725/134 |
| 2015/0325268 A1* | 11/2015 | Berger | H04N 21/44204 386/248 |
| 2015/0358688 A1* | 12/2015 | Kummer | H04N 21/812 725/9 |
| 2015/0382042 A1* | 12/2015 | Wagenaar | H04L 65/605 725/34 |
| 2016/0080445 A1* | 3/2016 | Kazerani | H04L 65/4076 709/219 |
| 2016/0080470 A1* | 3/2016 | Shanson | H04N 21/8455 709/219 |
| 2016/0205443 A1* | 7/2016 | Ghadi | H04N 21/6125 725/34 |
| 2017/0230699 A1* | 8/2017 | Haberman | H04N 21/25435 |
| 2018/0189823 A1* | 7/2018 | Xie | G06Q 30/0243 |
| 2019/0141401 A1* | 5/2019 | Rose | H04N 21/47202 |
| 2019/0313135 A1* | 10/2019 | Pathak | H04N 21/23424 |

\* cited by examiner

AUTOMATED CONTENT COMPILATION

BACKGROUND

The production of media content on a near live basis, i.e., production occurring close to the time the media content is broadcast or otherwise distributed, is necessary or desirable for certain types of content. For example, in television production, shows are often turned around quickly, meaning that they are shot, quickly edited and then aired on the same day; sometimes just an hour or so after they are shot, for instance. This production time frame presents particular complexities for placing commercials into the programming because the production group creating the show typically works independently from the traffic and scheduling groups that sell, format, and integrate the commercials with the show.

A conventional workflow for delivery of near live media content has a production group produce a show with empty, real time placeholders for eventual insertion of commercials. The traffic and/or scheduling groups later sequence and run the commercials independently, using a separate playback device, as the show is being played out to an audience. This conventional approach is performed manually, and is labor intensive as well as inefficient.

SUMMARY

There are provided systems and methods for performing automated content compilation, substantially as shown in and/or described in connection with at least one of the figures, and as set forth more completely in the claims.

DETAILED DESCRIPTION

Figure 1:
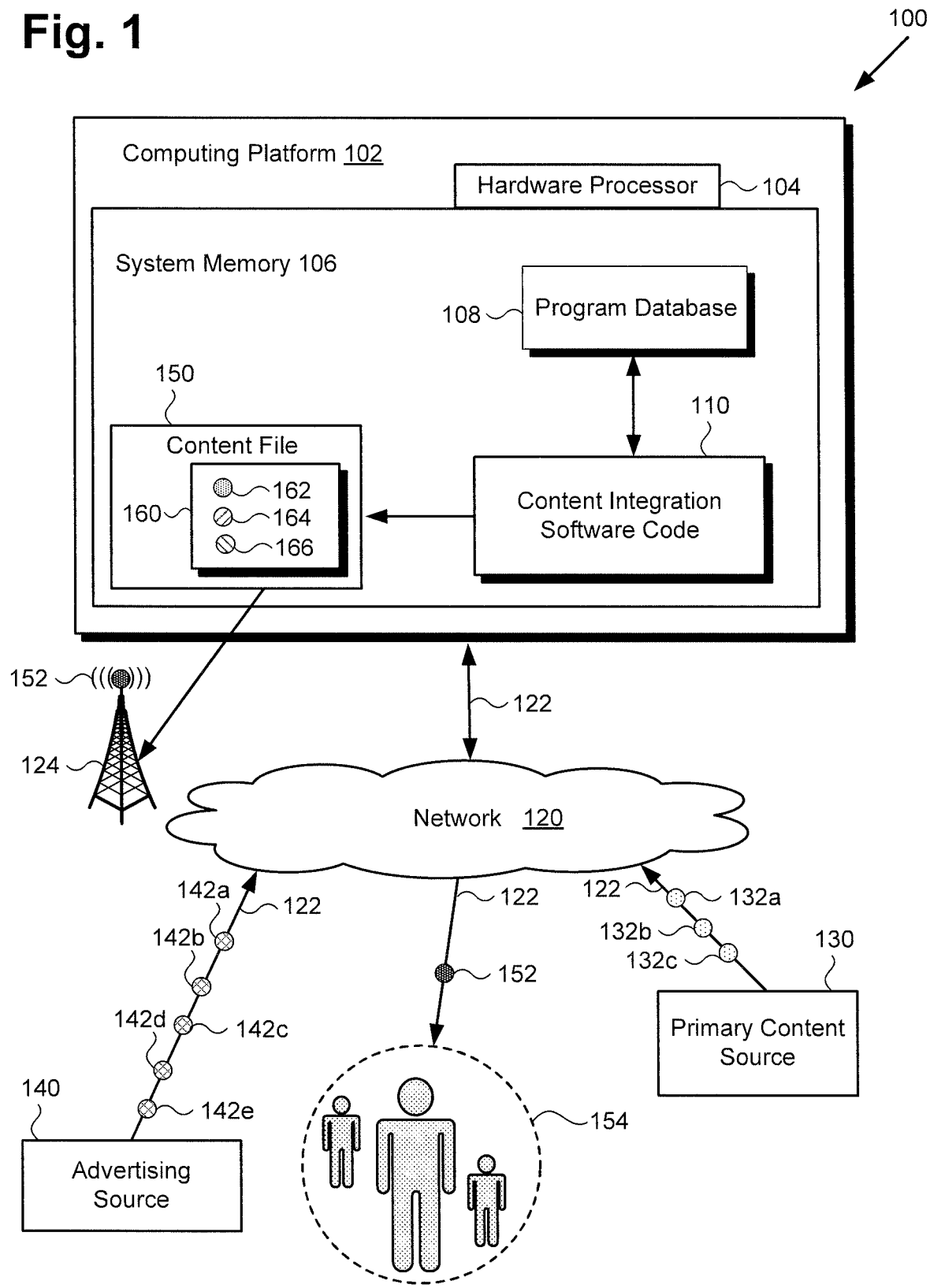
FIG. 1 shows a diagram of a an exemplary system for performing automated content compilation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

It is noted that, as used in the present application, the terms "automation," "automated", and "automating" refer to systems and processes that do not require human intervention. Although, in some implementations, a human editor or annotator may review or even modify a content playlist produced by the automated systems and according to the automated methods described herein, that human involvement is optional. Thus, the methods described in the present application may be performed under the control of hardware processing components of the disclosed systems.

FIG. 1 shows a diagram of exemplary automated content compilation system 100, according to one implementation. As shown in FIG. 1, automated content compilation system 100 is utilized within a program production and distribution environment including communication network 120, primary content source 130 providing primary content segments 132a, 132b, and 132c (hereinafter also "primary content segments 132a-132c"), and advertising source 140 providing commercials 142a, 142b, 142c, 142d, and 142e (hereinafter also "commercials 142a-142e"). Also shown in FIG. 1 are network communication links 122, broadcast service 124, and integrated content stream 152 delivering media content 162 including primary content segments 132a-132c and commercials 142a-142e to consumers 154.

As further shown in FIG. 1, automated content compilation system 100 includes computing platform 102 having hardware processor 104, and system memory 106 implemented as a non-transitory storage device. According to the exemplary implementation shown in FIG. 1, system memory 106 stores program database 108 and content integration software code 110 configured to provide content file 150. In addition, FIG. 1 shows data structure 160 of content file 150 including media content 162, playlist 164, and database record 166.

It is noted that, although the present application refers to program database 108 and content integration software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts program database 108 and content integration software code 110 as being mutually co-located in system memory 106, that representation is also merely provided as an aid to conceptual clarity. More generally, automated content compilation system 100 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within automated content compilation system 100. Thus, it is to be understood that program database 108 and content integration software code 110 may be stored remotely from one another within the distributed memory resources of automated content compilation system 100.

According to the implementation shown in FIG. 1, hardware processor 104 of computing platform 102 can execute content integration software code 110 to receive commercials 142a-142e for presentation with media content 162 including primary content segments 132a-132c and predetermined advertising intervals, and to assemble commercial clusters (not shown in FIG. 1) corresponding respectively to the predetermined advertising intervals, each of the commercial clusters including a subset of commercials 142a-142e. Hardware processor 104 may further execute content integration software code 110 to receive primary content segments 132a-132c, and compile content file 150 including data structure 160 having the commercial clusters linked with primary content segments 132a-132c.

It is noted that, in addition to the commercial clusters linked with primary content segments 132a-132c, data structure 160 further includes at least playlist 164 identifying a location of each of commercials 142a-142e in data structure 160. Playlist 164 enables dynamic substitution of one or more of commercials 142a-142e during playout of media content 162. It is also noted that, playlist 164 may correspond to more than one playlist. For example, in some implementations, it may be advantageous or desirable to provide multiple alternative playlists, each enabling dynamic substitution of one or more of commercials 142a-142e during playout of media content 162. Thus, the feature identified by reference number 164 in FIG. 1 may correspond to a single playlist, or to multiple playlists (hereinafter "playlist(s) 164").

In some implementations, data structure 160 also includes database record 166 describing primary content segments 132a-132c, commercials 142a-142e, the commercial clusters, and playlist 164(s). Although, as noted above playlist(s) 164 alone enable(s) dynamic substitution of one or more of commercials 142a-142e during playout of media content 162, the inclusion of playlist(s) 164 and database record 166 in data structure 160 can confer additional advantages. For example, the combination of playlists(s) 164 and database record 166 enables the future reordering or replacement of one or more of commercials 142a-142e during subsequent video on demand (VOD), subscription VOD (SVOD), or over the top (OTT) Internet based streaming service distribution of media content 162.

Hardware processor 104 may execute content integration software code 110 to provide content file 150 containing data structure 160 for playout of media content 162 as integrated content stream 152 including primary content segments 132a-132c, and the commercial clusters including commercials 142a-142e. In one such implementation, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of private or limited distribution network.

Figure 2:
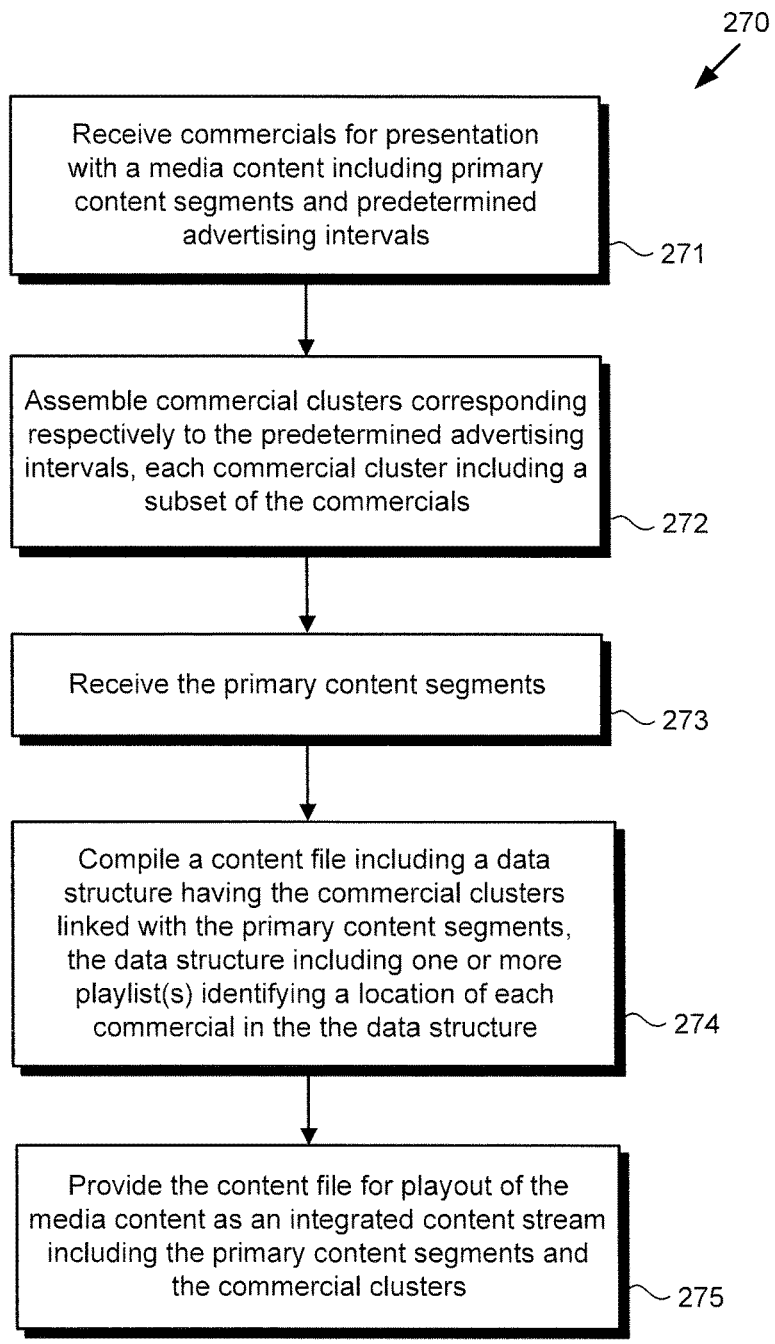
FIG. 2 is a flowchart presenting an exemplary method for performing automated content compilation, according to one implementation.

The functionality of content integration software code 110 will be further described by reference to FIG. 2 in combination with FIGS. 1 and 3. FIG. 2 shows flowchart 270 presenting an exemplary method for performing automated content compilation, according to one implementation. With respect to the method outlined in FIG. 2, it is noted that certain details and features have been left out of flowchart 270 in order not to obscure the discussion of the inventive features in the present application.

Figure 3:
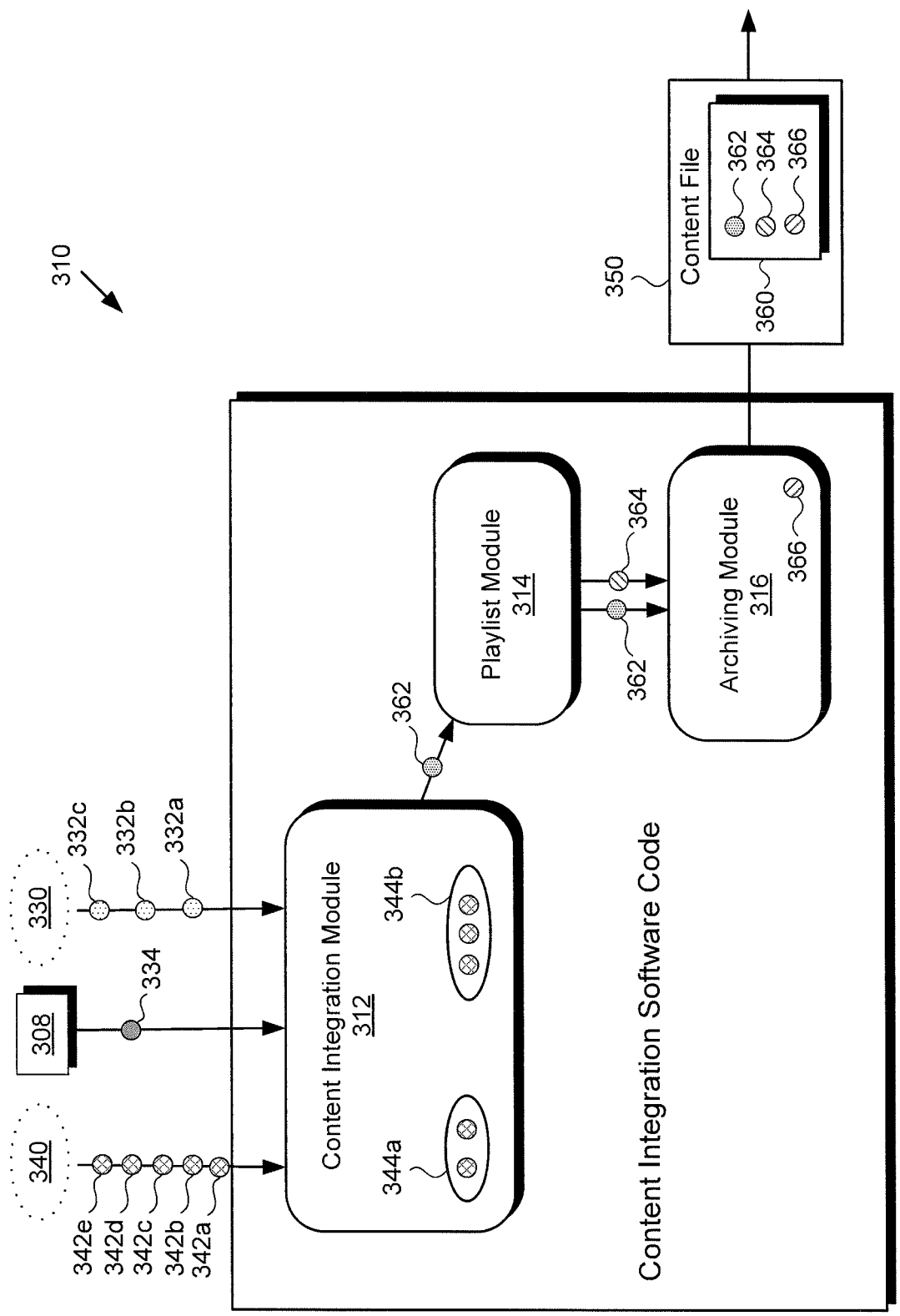
FIG. 3 shows an exemplary diagram of a content integration software code suitable for execution by a hardware processor of a system for performing automated content compilation, according to one implementation.

FIG. 3 shows exemplary content integration software code 310 suitable for execution by hardware processor 104 of computing platform 102, according to one implementation. As shown in FIG. 3, content integration software code 310 may include content integration module 312, playlist module 314, and archiving module 316. In addition, FIG. 3 shows primary content segments 332a, 332b, and 332c (hereinafter also "primary content segments 332a-332c") received from primary content source 330, and commercials 342a, 342b, 342c, 342d, and 342e (hereinafter also "commercials 342a-342e") received from advertising source 340. Also shown in FIG. 3 are program database 308, program format 334, commercial clusters 344a and 344b, and content file 350 compiled by content integration software code 310. As further shown in FIG. 3, content file 350 includes data structure 360 containing media content 362, playlist(s) 364, and database record 366.

Primary content source 330, primary content segments 332a-332c, advertising source 340, commercials 342a-342e, and program database 308 correspond respectively in general to primary content source 130, primary content segments 132a-132c, advertising source 140, commercials 142a-142e, and program database 108, in FIG. 1. In other words, primary content source 330, primary content segments 332a-332c, advertising source 340, commercials 342a-342e, and program database 308 may share any of the characteristics attributed to respectively corresponding primary content source 130, primary content segments 132a-132c, advertising source 140, commercials 142a-142e, and program database 108 by the present disclosure, and vice versa.

In addition, content file 350, data structure 360, media content 362, playlist(s) 364, and database record 366, in FIG. 3, correspond respectively in general to content file 150, data structure 160, media content 162, playlist(s) 164, and database record 166, in FIG. 1. Thus, content file 350, data structure 360, media content 362, playlist(s) 364, and database record 366 may share any of the characteristics attributed to respectively corresponding content file 150, data structure 160, media content 162, playlist(s) 164, and database record 166 by the present disclosure, and vice versa.

Content integration software code 310 corresponds in general to content integration software code 110, in FIG. 1, and those corresponding features may share any of the characteristics attributed to either corresponding feature by the present disclosure. That is to say, like content integration software code 310, content integration software code 110 may include modules corresponding to exemplary content integration module 312, playlist module 314, and archiving module 316.

Referring now to FIG. 2 in combination with FIGS. 1 and 3, flowchart 270 begins with receiving multiple commercials 142a-142e/342a-342e for presentation with media content 162/362 including primary content segments 132a-132c/332a-332c and predetermined advertising intervals (action 271). For example, as shown in FIG. 1, commercials 142a-142e/342a-342e may be received from advertising source 140/340 via communication network 120 and network communication links 122. Commercials 142a-142e/342a-342e may be received by content integration software code 110/310, executed by hardware processor 104.

In one implementation, content integration software code 110/310 may be executed by hardware processor 104 to obtain or otherwise receive program format 334 corresponding to media content 162/362 from program database 108/308.

Program format 334 may include time code and content insertion metadata describing media content 162/362. For example, program format 334 may include the number of advertising intervals in media content 162/362, the length of each advertising interval expressed in time, and the respective timecode locations of the beginning and end of each advertising interval on the timecode of media content 162/362. Alternatively, or in addition, program format 334 may describe the length of each advertising interval included in media content 162/362 in terms of its length in video frames, as well as identifying the respective video frames at the beginning and end of each advertising interval.

Flowchart 270 continues with assembling commercial clusters 344a and 344b corresponding respectively to the predetermined advertising intervals included in media content 162/362, each of commercial clusters 344a and 344b including a subset of commercials 142a-142e/342a-342e (action 272). Assembly of commercial clusters 344a and 344b may be performed by content integration software code 110/310, executed by hardware processor 104, and using content integration module 312. In some implementations, for instance, assembly of commercial cluster 344a or 344b may include transcoding and/or stitching two or more of commercials 142a-142e/342a-342e to form the commercial cluster.

By way merely of example, in one use case, media content 162/362 may include two advertising intervals, the first having a time duration of one minute, and the second having a time duration of two and a half minutes. Furthermore, action 271 may result in receipt of commercials 142a/342a and 142c/342c each having a time duration of thirty seconds, commercials 142b/342b and 142e/342e each having a time duration of forty-five seconds, and commercial 142d/342d having a time duration of sixty seconds.

In the exemplary use case described above, commercial cluster 344a may be assembled to fill the first advertising interval lasting one minute, while commercial cluster 344b may be assembled to fill the second advertising interval lasting two and a half minutes. That is to say, commercial cluster 344a may be assembled to include thirty second commercials 142a/342a and 142c/342c, while commercial cluster 344b may be assembled to include sixty second commercial 142d/342d and both of forty-five second commercials 142b/342b and 142e/342e.

Thus, based on the information provided in program format 334 corresponding to media content 162/362, content integration software code 110/310, executed by hardware processor 104, may assemble content clusters 344a and 344b to precisely fit the advertising intervals included in media content 162/362. Moreover, the assembly of content clusters 344a and 344b may occur at any time subsequent to receiving commercials 142a-142e/342a-342e. In other words, according to the present novel and inventive principles, assembly of commercial clusters 344a and 344b may be performed independently of and prior to receipt of primary content segments 132a-132c/332a-332c of media content 162/362 by content integration software code 110/310.

Flowchart 270 continues with receiving primary content segments 132a-132c/332a-332c (action 273). As shown in FIG. 1, primary content segments 132a-132c/332a-332c may be received from primary content source 130/330, via communication network 120 and network communication links 122, for example. Primary content segments 132a-132c/332a-332c may be received by content integration software code 110/310, executed by hardware processor 104.

Primary content segments 132a-132c/332a-332c may include a wide variety of content types. Examples of primary content segments 132a-132c/332a-332c include movie content, game content, and television programming content, to name a few. Nevertheless, the enhanced efficiencies enabled by the present novel and inventive concepts may be especially advantageous when some or all of primary content segments 132a-132c/332a-332c include near live content that is produced substantially in parallel with assembly of content clusters 344a and 344b. Thus, in some implementations, primary content segments 132a-132c/332a-332c may include near live content in the form of news content or interviews or other type of talk show content.

Flowchart 270 continues with compiling content file 150/350 including data structure 160/360 having commercial clusters 344a and 344b linked with primary content segments 132a-132c/332a-332c, data structure 160/360 including playlist(s) 164/364 identifying a location of each of commercials 142a-142e/342a-342e in data structure 160/360 (action 274). In one implementation, content file 150/350 including data structure 160/360 may be compiled by content integration software code 110/310, executed by hardware processor 104, and using content integration module 312 and playlist module 314.

For example, according to the exemplary implementation shown in FIG. 3, content integration module 312 of content integration software code 110/310 may be executed using hardware processor 104 to integrate commercial clusters 344a and 344b with primary content segments 132a-132c/332a-332c. For instance, commercial cluster 344a may be substituted for the first advertising interval of media content 162/362 so as to link primary content segments 132a/332a and 132b/332b. In addition, commercial cluster 344b may be substituted for the second advertising interval of media content 162/362 so as to link primary content segments 132b/332b and 132c/332c.

Following the linking of commercial clusters 344a and 344b and primary content segments 132a-132c/332a-332c, media content 162/362 now including commercial clusters 344a and 344b and primary content segments 132a-132c/332a-332c, may be transferred to playlist module 314. Playlist module 314 of content integration software code 110/310 may then be executed using hardware processor 104 to generate playlist(s) 164/364 identifying the location of each of commercials 142a-142e/342a-342e in data structure 160/360.

It is noted that playlist(s) 164/364 may also identify the locations of each of primary content segments 132a-132c/332a-332c in data structure 160/360. It is further noted that the locations of each of primary content segments 132a-132c/332a-332c and/or commercials 142a-142e/342a-342e may be identified by playlist(s) 164/364 as a timecode location on the timecode of media content 162/362 and/or as a video frame number of media content 162/362. Thus, any or all of the beginning, the end, and the length of each of primary content segments 132a-132c/332a-332c and/or commercials 142a-142e/342a-342e may be identified by playlist(s) 164/364 using its respective time code location and/or frame number.

It is also noted that in some implementations, as shown in FIG. 3, content integration software code 110/310 may further include archiving module 316. In those implementations, archiving module 316 of content integration software code 110/310 may be executed using hardware processor to generate database record 166/366 for inclusion with media content 162/362 and playlist(s) 164/364 in data structure 160/360. Database record 166/366 may describe each of primary content segments 132a-132c/332a-332c, commercials 142a-142e/342a-342e, commercial clusters 344a and 344b, and playlist(s) 164/364.

Data structure 160/360 containing media content 162/362 including commercial clusters 344a and 344b and primary content segments 132a-132c/332a-332c, and further including at least playlist(s) 164/364 identifying the locations of commercials 142a-142e/342a-342e in data structure 160/360 advantageously enables dynamic substitution of one or more of commercials 142a-142e/342a-342e during playout of media content 162/362. Moreover, in some implementations, data structure 160/360 also contains database record 166/366 describing primary content segments 132a-132c/332a-332c, commercials 142a-142e/342a-342e, commercial clusters 344a and 344b, and playlist(s) 164/364. In implementations in which data structure 160/360 includes database record 166/366 as well as playlist(s) 164/364, playlist(s) 164/364 and database record 166/366 can be advantageously utilized together to enable the future reordering or replacement of one or more of commercials 142a-142e/342a-342e during subsequent VOD, SVOD, or OTT Internet based streaming service distribution of media content 162/362.

Flowchart 270 may conclude with providing content file 150/350 for playout of media content 162/362 as integrated content stream 152 including primary content segments 132a-132c/332a-332c and commercial clusters 344a and 344b (action 275). In some implementations, content file 150/350 may be provided to an OTT content distributor for playout of media content 162/362 to consumers 154 as integrated content stream 152 over communication network 120 and network communication links 122. Alternatively, or in addition, content file 150/350 may be provided to broadcast service 124 for distribution of media content 162/362 to consumers 154 as integrated broadcast content stream 152. Content file 150/350 may be provided for playout of media content 162/362 by content integration software code 110/310, executed by hardware processor 104.

Thus, the present application discloses systems and method for performing automated content compilation that address and overcome the drawbacks and deficiencies in the conventional art. The content compilation solution disclosed in the present application can be used to substantially minimize the time required for producing and preparing media content, such as TV programming content, for airing, while concurrently enhancing the way that program segments and advertising content are integrated. In addition, by providing a data structure containing the program segments and commercials, and further including a playlist identifying the locations of commercials in the data structure, the present solution advantageously enables dynamic substitution of one or more commercials during playout of the media content. Moreover, by including a database record describing the program segments, commercials, commercial clusters, and playlist in the data structure, the present solution advantageously facilitates reordering or replacement of the commercials included in the data structure during subsequent VOD, SVOD, or OTT distribution of the media content.

From the above description it is manifest that various techniques can be used for implementing the concepts described in the present application without departing to from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An automated content compilation system comprising:
a computing platform including a hardware processor and a system memory storing a content integration software code;
the hardware processor configured to execute the content integration software code to:
receive a plurality of commercials for presentation with a media content, the media content including primary content segments and predetermined advertising intervals;
assemble commercial clusters corresponding respectively to the predetermined advertising intervals, wherein at least one of the commercial clusters is formed by stitching together two or more of the plurality of commercials and transcoding the stitched two or more of the plurality of commercials, each of the commercial clusters including a subset of the plurality of commercials;
receive the primary content segments;
compile a content file including a data structure having the commercial clusters linked with the primary content segments, the data structure including at least one playlist identifying a location of each one or more of the plurality of commercials in the data structure; and
provide the content file for playout of the media content as an integrated content stream including the primary content segments and the commercial clusters.

2. The automated content compilation system of claim 1, wherein the at least one playlist enables dynamic substitution of at least one of the plurality of commercials during playout of the media content.

3. The automated content compilation system of claim 1, wherein the data structure further comprises a database record describing the primary content segments, the plurality of commercials, the commercial clusters, and the at least one playlist.

4. The automated content compilation system of claim 1, wherein the location of each of the plurality of commercials in the data structure identified by the at least one playlist comprises a timecode location on a timecode of the media content.

5. The automated content compilation system of claim 1, wherein the location of each of the plurality of commercials in the data structure identified by the at least one playlist comprises a video frame number of the media content.

6. The automated content compilation system of claim 1, wherein the primary content segments comprise at least one of television programming content, news content or talk show content.

7. A method for use by an automated content compilation system including a computing platform having a hardware processor and a system memory storing a content integration software code, the method comprising:
receiving, using the hardware processor executing the content integration software code, a plurality of commercials for presentation with a media content, the media content including primary content segments and predetermined advertising intervals;
assembling, using the hardware processor executing the content integration software code, commercial clusters corresponding respectively to the predetermined advertising intervals, wherein at least one of the commercial clusters is formed by stitching together two or more of the plurality of commercials and transcoding the stitched two or more of the plurality of commercials, each of the commercial clusters including a subset of the plurality of commercials;

receiving, using the hardware processor executing the content integration software code, the primary content segments;

compiling, using the hardware processor executing the content integration software code, a content file including a data structure having the commercial clusters linked with the primary content segments, the data structure including at least one playlist identifying a location of each one or more of the plurality of commercials in the data structure; and providing, using the hardware processor executing the content integration software code, the content file for playout of the media content as an integrated content stream including the primary content segments and the commercial clusters.

8. The method of claim 7, wherein the at least one playlist enables dynamic substitution of at least one of the plurality of commercials during playout of the media content.

9. The method of claim 7, wherein the data structure further comprises a database record describing the primary content segments, the plurality of commercials, the commercial clusters, and the at least one playlist.

10. The method of claim 7, wherein the location of each of the plurality of commercials in the data structure identified by the at least one playlist comprises a timecode location on a timecode of the media content.

11. The method of claim 7, wherein the location of each of the plurality of commercials in the data structure identified by the at least one playlist comprises a video frame number of the media content.

12. The method of claim 7, wherein the primary content segments comprise at least one of television programming content, news content or talk show content.

13. A computer-readable non-transitory medium having stored thereon a content integration software code including instructions, which when executed by a hardware processor, instantiate a method comprising:

receiving a plurality of commercials for presentation with a media content, the media content including primary content segments and predetermined advertising intervals;

assembling commercial clusters corresponding respectively to the predetermined advertising intervals, wherein at least one of the commercial clusters is formed by stitching together two or more of the plurality of commercials and transcoding the stitched two or more of the plurality of commercials, each of the commercial clusters including a subset of the plurality of commercials;

receiving the primary content segments;

compiling a content file including a data structure having the commercial clusters linked with the primary content segments, the data structure including at least one playlist identifying a location of each one or more of the plurality of commercials in the data structure; and providing the content file for playout of the media content as an integrated content stream including the primary content segments and the commercial clusters.

14. The computer-readable non-transitory medium of claim 13, wherein the at least one playlist enables dynamic substitution of at least one of the plurality of commercials during playout of the media content.

15. The computer-readable non-transitory medium of claim 13, wherein the data structure further comprises a database record describing the primary content segments, the plurality of commercials, the commercial clusters, and the at least one playlist.

16. The computer-readable non-transitory medium of claim 13, wherein the location of each of the plurality of commercials in the data structure identified by the at least one playlist comprises at least one of a timecode location on a timecode of the media content and a video frame number of the media content.

17. The computer-readable non-transitory medium of claim 13, wherein the primary content segments comprise at least one of television programming content, news content or talk show content.

18. The automated content compilation system of claim 1, wherein the hardware processor is configured to execute the content integration software code to assemble the commercial clusters prior to and independent of receiving the primary content segments to fit the predetermined advertising intervals.

19. The method of claim 7, wherein the commercial clusters are assembled prior to and independent of receiving the primary content segments to fit the predetermined advertising intervals.

20. The computer-readable non-transitory medium of claim 13, wherein the commercial clusters are assembled prior to and independent of receiving the primary content segments to fit the predetermined advertising intervals.

\* \* \* \* \*